United States Patent [19]

Anderson et al.

[11] 4,143,503

[45] Mar. 13, 1979

[54] FLAT TURRET TRANSPORTING MECHANISM

[75] Inventors: Andrew W. Anderson, West Caldwell; Paul R. Rolando, Dumont, both of N.J.

[73] Assignee: Scandia Packaging Machinery Company, Clifton, N.J.

[21] Appl. No.: 767,966

[22] Filed: Feb. 11, 1977

[51] Int. Cl.² .................. B65B 11/06; B65G 23/08
[52] U.S. Cl. .................................. 53/228; 198/834
[58] Field of Search .................. 53/228; 198/832, 834, 198/835, 854

[56] References Cited

U.S. PATENT DOCUMENTS

| | | | |
|---|---|---|---|
| 2,591,089 | 4/1952 | Moon | 198/835 |
| 3,051,298 | 8/1962 | Knight | 198/834 |
| 3,483,639 | 12/1969 | Eftefield et al. | 198/834 X |
| 3,647,046 | 3/1972 | Tanguay et al. | 198/865 |
| 3,877,203 | 4/1975 | Anderson | 53/228 |

*Primary Examiner*—Travis S. McGehee
*Attorney, Agent, or Firm*—Neil F. Markva

[57] ABSTRACT

The apparatus for transporting an article includes a conveyor and a means for driving the conveyor synchronously and intermittently at least two driving positions along a path having a plurality of work stations. The apparatus will intermittently move the article from one work station to another with the conveyor being substantially completely driven without any drive function being associated therewith. A further feature of the invention includes the vertical adjustment of the transporting mechanism with respect to a moving package to be wrapped in conjunction with a wrapping machine. Another feature is directed to the specific sprocket construction used in a closed loop means. The flat turret transporting mechanism includes a plurality of pockets for receiving packages to be wrapped between an input and an output work station.

17 Claims, 7 Drawing Figures

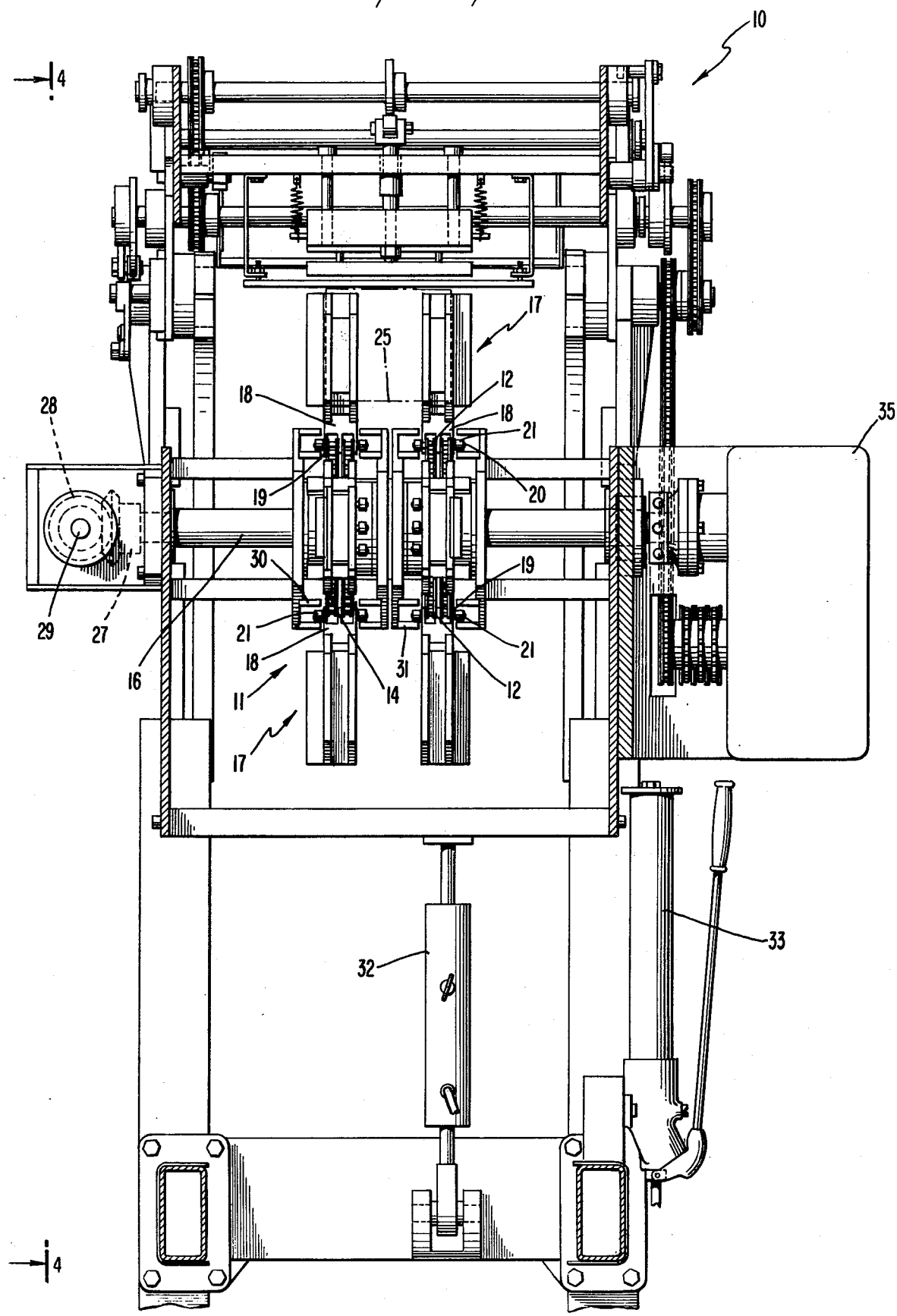

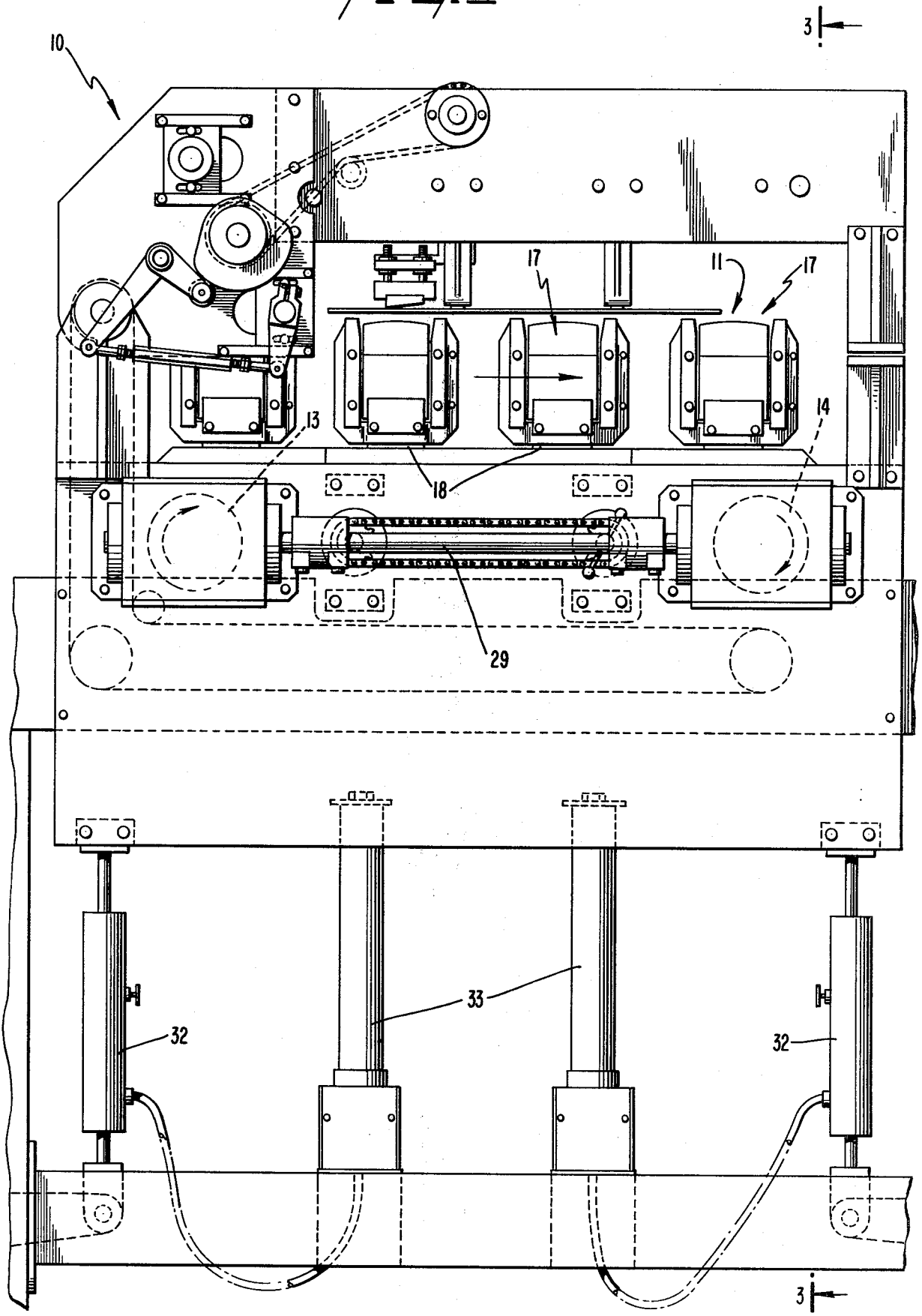

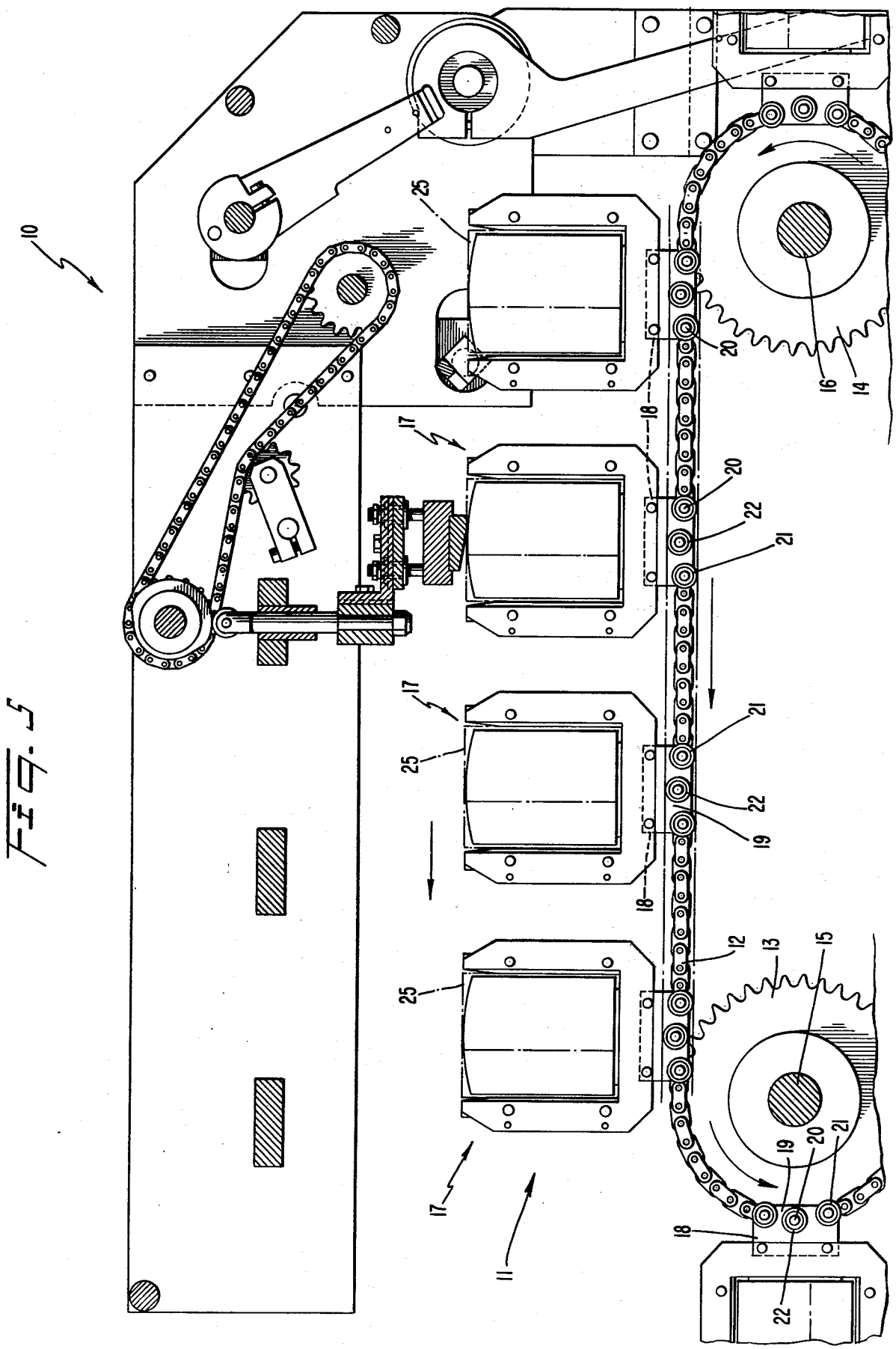

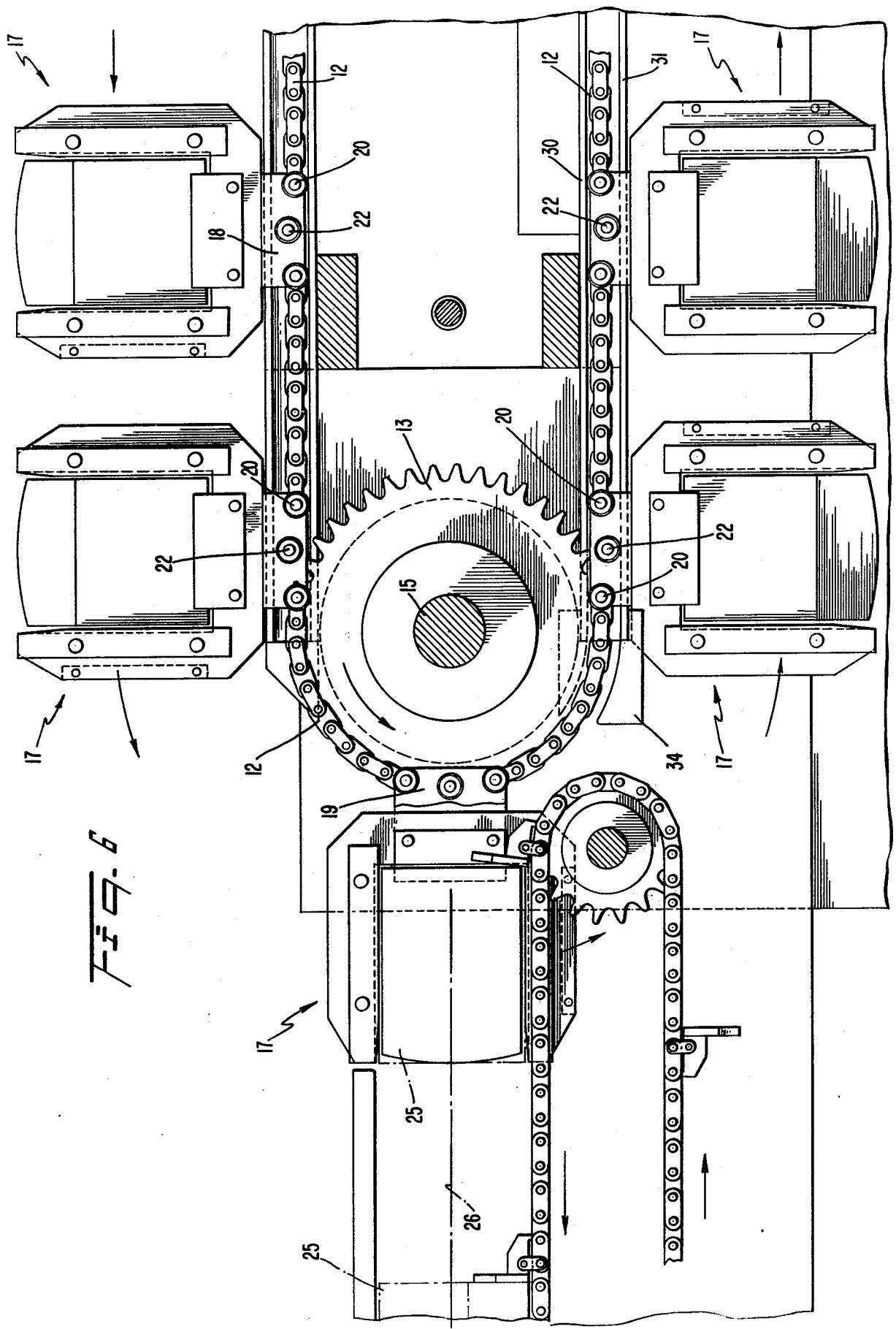

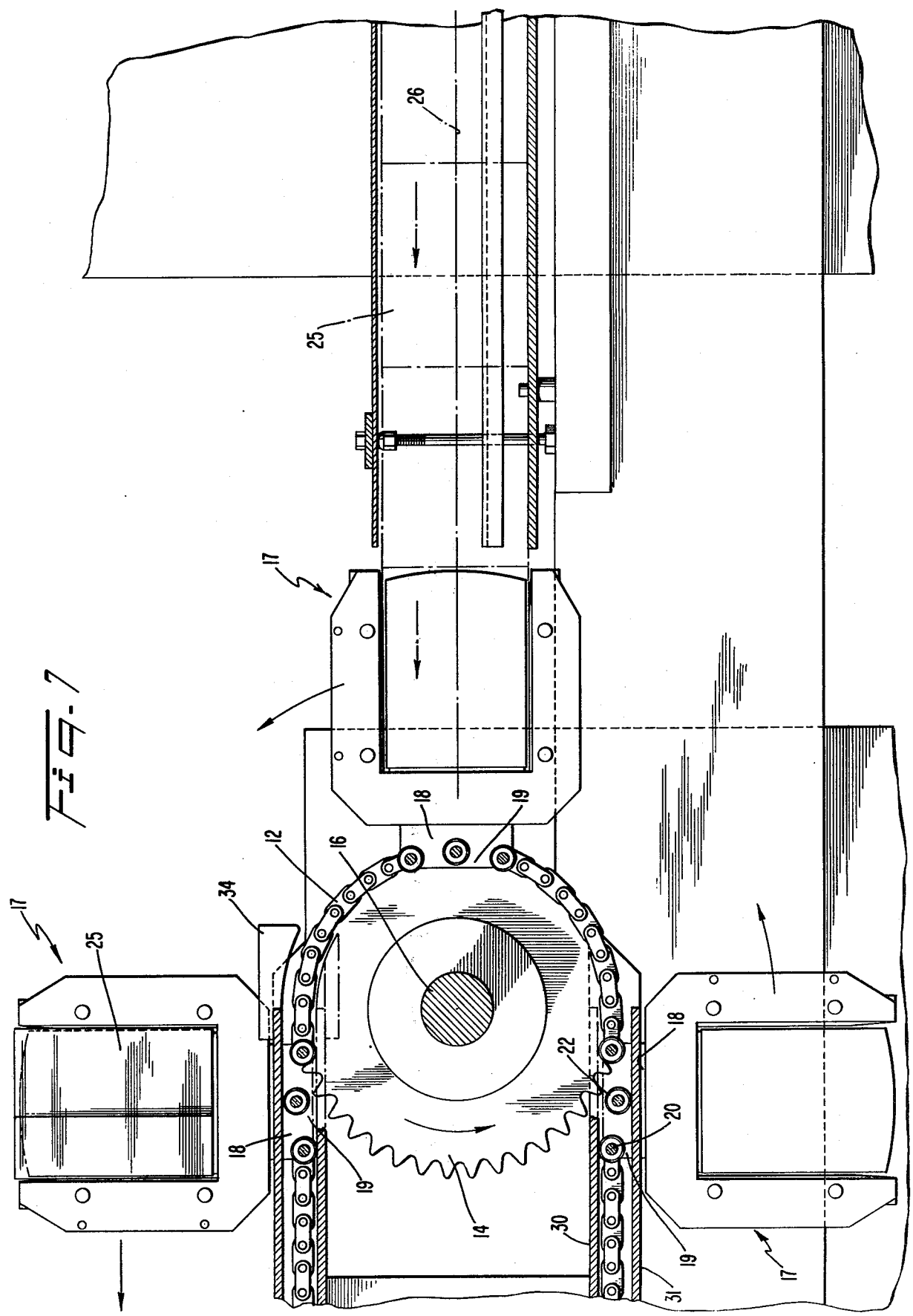

FLAT TURRET TRANSPORTING MECHANISM

BACKGROUND OF THE INVENTION

This invention relates to the transporting of articles via a conveyor mechanism having a particular type of driving structure. More particularly, the transporting apparatus is used in combination with a machine for wrapping packages.

This invention constitutes an improvement over the U.S. Pat. No. 3,877,203 relating to the wrapping of packages with a sheet of wrapping material that has been draped therearound. Difficulties have been encountered with the prior art machine in that the closed loop chain used for carrying the pockets was also used to effect a driving function. That is, the drive of that prior art device was effected at one end only of the loop. The other end of the loop was disposed around a sprocket that was actually driven by the chain itself. Consequently, it was discovered that the chain on the prior art structure would wear out quickly thereby adversely affecting the quality of the wrapped package being produced. Furthermore, any wear on the chain or on the sprocket during operation of the machine resulted in a shut down while appropriate maintenance steps were taken.

A further disadvantage of the prior art structure was that the drive sprockets on the closed loop had to have an unusual structural configuration to provide the necessary support to the pockets being carried by the chain around the spocket wheels. This unusual type of structure required additional machining and expense at the outset of manufacturing.

It was also found that the flat turret transporting mechanism of the prior art was set for a fixed size and shape of article being introduced therein. That is, it was found, quite unexpectedly, that the condition of the ultimate wrapped package depended upon the manner in which the article to be packaged was introduced into the flat turret transporting mechanism for effecting wrapping operations thereon.

PURPOSE OF THE INVENTION

The primary object of this invention is to provide an article transporting apparatus having a simplified construction and an extended operational life when compared to prior art structures of the same type.

A further object of the invention is to provide a transporting apparatus having a closed loop conveying means which is free of any driving function.

Another object of this invention is to provide an apparatus for transporting an article intermittently from one work station to another with the conveyor being substantially completely driven.

Another object of this invention is to provide a flat turret transporting apparatus which may be used in combination with a wrapping machine so that the package is received in an input work station in a manner to avoid any misalignment with respect to the wrapping materials used to wrap the article.

A still further object of this invention is to provide a means for vertically adjusting the flat turret transporting apparatus with respect to an incoming article having been subjected to a preliminary wrapping operation.

A still further object of this invention is to provide a closed loop conveyor having a wheel drive obviating the necessity for specially designed sprocket members.

SUMMARY OF THE INVENTION

These objects and other advantages are accomplished by the apparatus as described herein. The flat turret transporting apparatus comprises a conveyor means for moving an article along a path having a plurality of work stations. A driving means effects synchronous and intermittent movement of the conveying means at at least two driving positions along the path. Thus, the article is intermittently moved from one work station to another with the conveying means being substantially completely driven. In other words, the conveyor which carries the article does not enter into the driving function of the transporting apparatus.

Another feature of the invention incorporates the use of an adjustment mechanism for adjusting the vertical height of the flat turret transporting apparatus when it is used in conjunction with a wrapping machine. More specifically, the wrapping machine would provide a wrapper sheet draped around the outside of an article. The draped article is moved along a path. The conveying means includes a pocket member that has a longitudinal axis which is aligned with the center line of the draped package upon introduction of the package into the transporting apparatus. The adjustment in a specific embodiment of the invention is accomplished through the use of hydraulic means located at substantially the center of mass for the transporting apparatus.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 3 is a sectional view along line III—III of FIG. 4;

FIG. 4 is a side elevational view on the side opposite that shown in FIG. 1;

FIG. 5 is a longitudinal sectional view of the apparatus of FIG. 1;

FIG. 6 is a fragmentary sectional view of the output end of the apparatus made in accordance with this invention; and FIG. 7 is a fragmentary sectional view of the input end of the apparatus of FIG. 6.

DESCRIPTION OF SPECIFIC EMBODIMENTS

Figure 1:
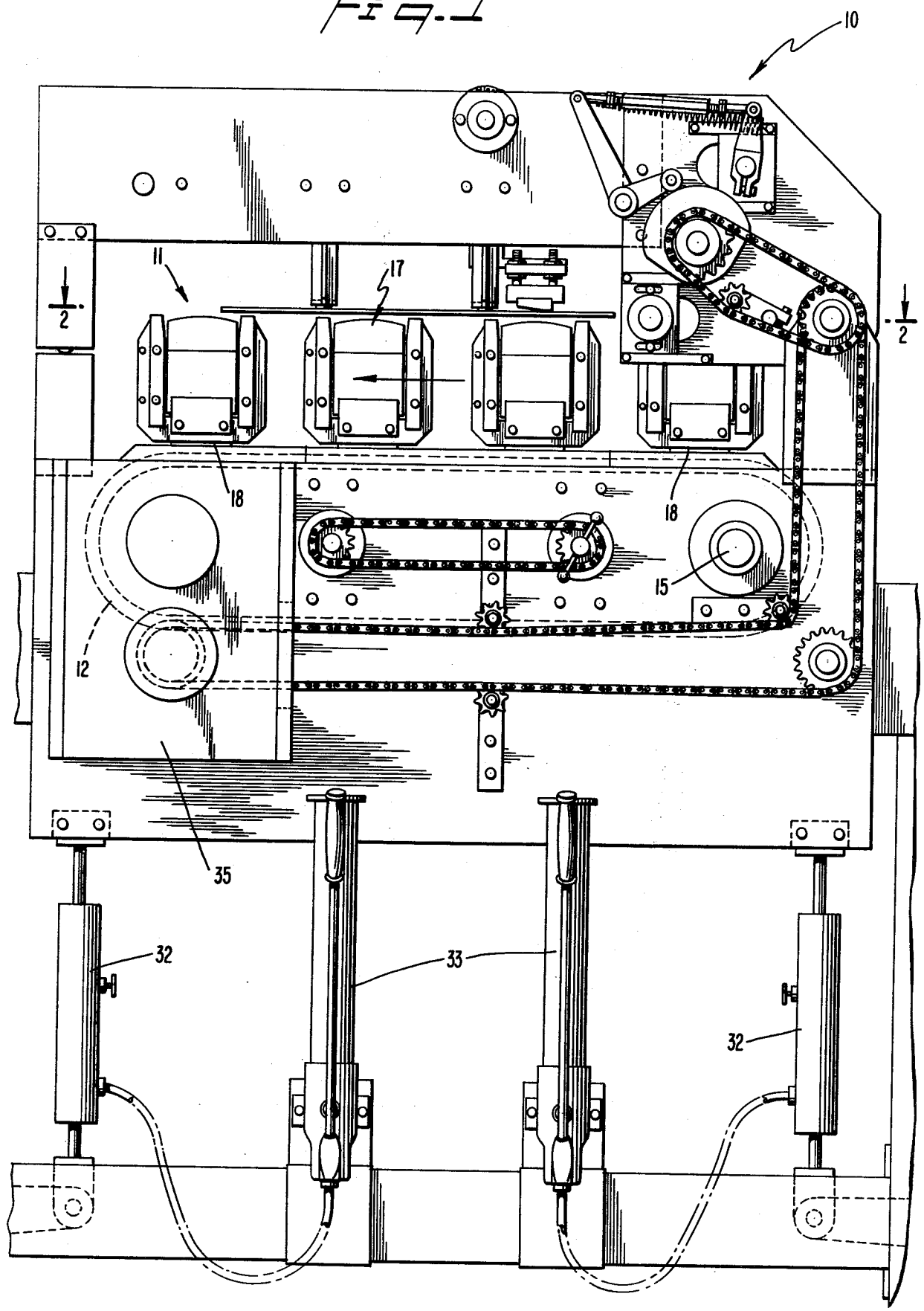
FIG. 1 is a side-elevational view of a transporting apparatus made in accordance with this invention.
Figure 2:
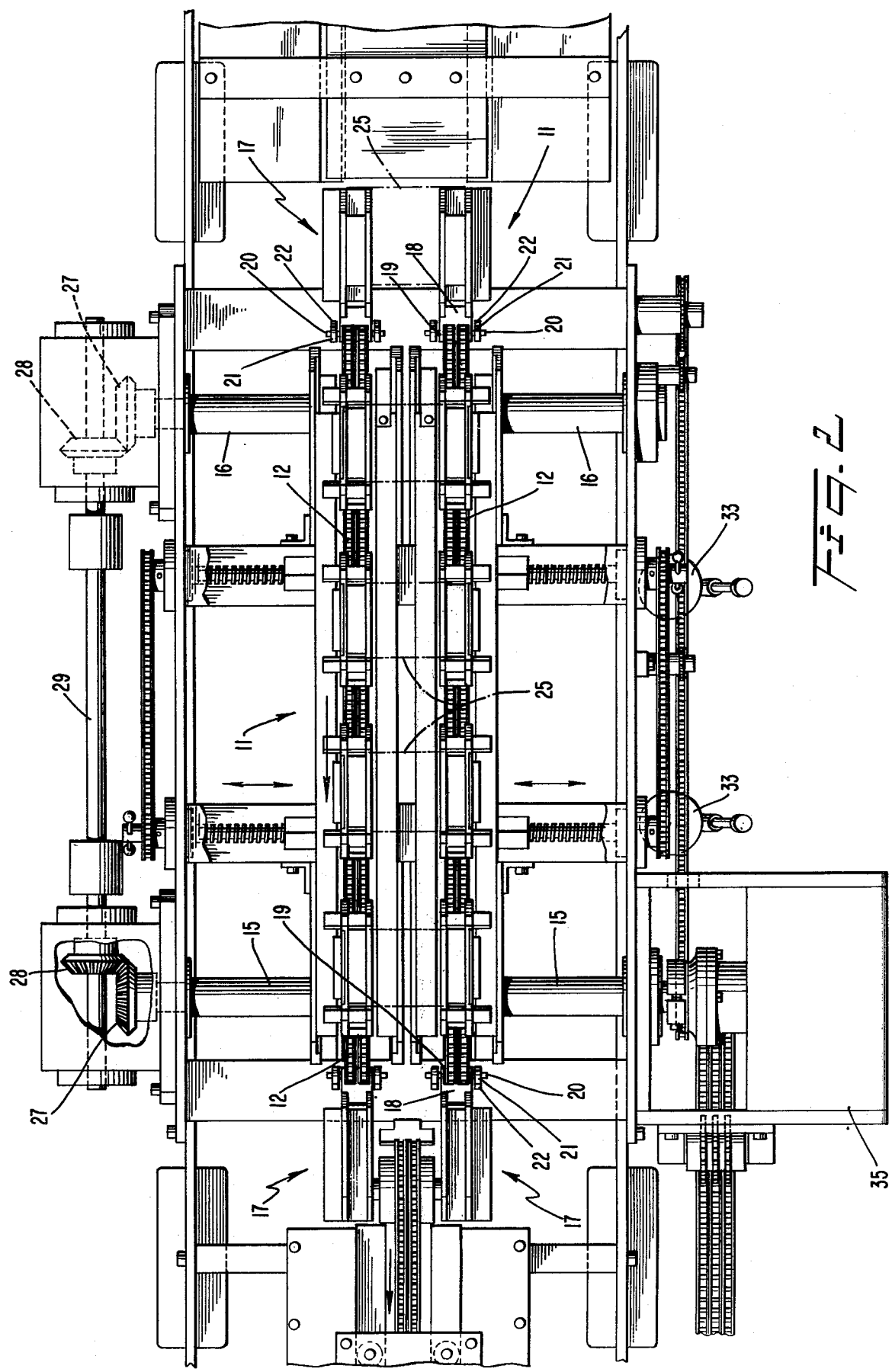
FIG. 2 is a sectional view along line II—II of FIG. 1.

More specifically, referring to the drawings, the transporting apparatus, generally designated 10, is commonly known as a flat turret conveying apparatus. The conveying means, generally designated 11, is used to move an article or package along a path having a plurality of work stations. The conveyor 11 includes a pair of closed loop chains 12 disposed around two pairs of sprockets 13 and 14 fixedly mounted for rotation on driven shafts 15 and 16, respectively. Sprocket members 13 and 14 are standard sprocket members which may be fixedly mounted to the respective shafts 15 and 16 in any well known manner.

The chain conveyor 11 is driven synchronously and intermittently at the two driving positions established by the location of the shafts 15 and 16. The sprockets 13 and 14 constitute wheel means disposed at the driving positions and the teeth on these sprockets constitute means for engaging the wheel means with the closed loop chain 12. Each sprocket wheel has a plurality of substantially identically shaped teeth uniformly spaced with respect to each other along the entire peripheral circumference thereof.

The conveyor 11 includes a plurality of pocket means, generally designated 17, and each of which includes a carrier block 18 directly connected at each end thereof to a link of chain 12. Each carrier block 18 has two outwardly projecting portions 19 which are laterally spaced to receive therebetween a length of chain 12. Each pivotally connected link is attached to a shaft 20 extending between the projecting portions 19. Roller bearings 21 are connected at each end of the pins 20 on the outside of the projecting portions 19. A third roller bearing 22 is disposed between bearings 21. The conveyor 11 includes guide rails 30 and 31 providing an upper guide surface and a lower guide surface, respectively. The rollers 21 contact one of the guide surfaces and roller 22 contacts the other guide surface during operation of conveyor 11.

Referring to FIGS. 6 and 7, the conveying mechanism 11 is seen in combination with a packaging machine receiving packages 25 from a cutting head such as found in co-pending application Ser. No. 707,074 filed in the U.S. Pat. and Trademark Office on July 20, 1976, and assigned to the same assignee. The pocket members 17 of conveyor 11 have an axis normal to the closed loop chain 12 and are disposed at a plurality of equally spaced locations along the entire path of operation. The pocket means 17 facilitate the wrapping of the article at at least one of the work stations located along the path. An input work station is shown in FIG. 7 and an output work station is shown in FIG. 6. The pockets 17 move through at least one package wrapping work station between the output and input work stations. The normal axis of the pocket means 17 at the input work station is perpendicular to the normal axis of the pocket means 17 located at the package wrapping work stations.

It has been found that the operation of the flat turret wrapping conveyor is directly affected by the positioning of the package 25 in the pocket 17. That is, it has been discovered that the center line 26 of the package coming into the input station must be in line with the normal axis of the pocket member 17. When the packages being wrapped are varied in size, it has become necessary to provide a vertical adjustment to the conveyor mechanism 11. In this specific embodiment, hydraulic lifts 32 are located at substantially the center of mass for raising and lowering the transporting apparatus 10. Hand-operated pumps 33 effect the appropriate movement of hydraulic fluid to effect the desired lifting. It is simply a matter of unloosening bolts that fix the transporting apparatus 10 in place and then tightening them up once the positioning has been effected. The adjusting mechanism is effective to align the normal axis of the pocket 17 at the input work station with the center line axis of the article 25 being received therein for subsequent transporting to the package wrapping work stations disposed above the conveyor 11.

One of the most important features of this invention, is directed to the transmission mechanism used to simultaneously and synchronously drive the shafts 15 and 16 of the conveyor 11. The sprockets 13 and 14 constitute wheel means fixedly mounted on the driven shafts 15 and 16, respectively, at the driving postions for the closed loop chain 12. The transmission means includes a driven gear 27 disposed at the end of each driven shaft 15 and 16. A transmission rod 29 includes a driving gear 28 disposed at each end thereof and engaging the driven gears 27. In this particular embodiment, gears 27 and 28 are bevel gears. This transmission mechanism transfers the rotary movement generated from the main drive through the known power coupling mechanism 35 which does not in and of itself form a part of this invention.

The use of the dual drive of the shafts 15 and 16 in synchronous and intermittent fashion completely eliminates chain 12 as a drive member. This removes all drive forces from acting thereon thereby eliminating wear, enabling the use of a standard sprocket wheel to be used at the drive stations and providing a general all over better control of the wrapping operation within the flat turret wrapping mechanism.

A further feature of the invention is directed to the use of an inlet guide mechanism 34 having a curved channel to direct movement of the roller bearings 21 and 22 into contact with the upper and lower guide surfaces in the rails 30 and 31, respectively. The guide mechanism is disposed at each end of the conveyor 11 at the inlet side of the rail mechanism. This has eliminated any problem of hang-ups with the pocket members 17 entering along the flat portion of the turret mechanism.

The various wrapping operations which may be effected along the path are illustrated in FIGS. 1 and 3–5 of the present application. The specific aspects of how these wrapping operations are effected are fully disclosed in U.S. Pat. No. 3,877,203 issued Apr. 15, 1975. It is clear that various other operations as necessitated by the particular desired results are clearly appropriate in conjunction with the use of the flat turret transporting apparatus 10.

While the flat turret transporting mechanism has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. An apparatus for wrapping an article comprising:
   (a) means providing an article having a sheet of wrapping material draped therearound so that the ends of the sheet project outwardly from one side and along opposing edges of the article,
   (b) conveying means for moving said article along a path having a plurality of work stations,
   (c) said conveying means including closed loop means having two fixed driving positions, and
   (d) means for synchronously and intermittently driving said closed loop means at said two driving positions along said path,
   (e) said driving means including rotatably mounted sprocket means disposed inside said closed loop means at the driving positions and means to engage the sprocket means with the closed loop means,
   (f) said closed loop means being free of any driving function and being substantially completely driven by said driving means at said two driving positions,
   (g) whereby the article is intermittently moved from one work station to another.

2. The apparatus as defined in claim 1 wherein the closed loop means comprises a pair of endless closed loop chains, and the sprocket means comprises a sprocket wheel located at each end of each closed loop chain.

3. The apparatus as defined in claim 1 wherein
each sprocket wheel having a plurality of substantially identically shaped teeth uniformly spaced with respect to each other along the entire peripheral circumference of the sprocket wheel.

4. The apparatus as defined in claim 3 wherein
the conveyor means includes a plurality of pocket means disposed along the length of the chain,
said pocket means being effective to receive said draped article.

5. The apparatus as defined in claim 4 wherein
each pocket means includes a carrier block being directly connected at each end thereof to a link of the chain.

6. The apparatus as defined in claim 1 wherein
the conveying means includes a plurality of pocket means and at least one endless closed loop chain having a plurality of links,
each pocket means includes a carrier block having two outwardly projecting portions laterally spaced to receive therebetween a link of the chain pivotally connected at each end of the block,
each pivotally connected link being attached to shaft means extending between the projecting portions,
roller bearing means being connected to the outside of said projecting portions with a roller means located at each end of each said shaft means extending therebetween.

7. The apparatus as defined in claim 6 wherein
the conveying means includes a rail guide means extending the length of the closed loop chain and having an upper guide surface and lower guide surface,
the roller bearing means including a third roller means on the outside of each projecting portion and located between the other two roller means,
whereby during operation of the conveyor said two roller means are in contact with one of the guide surfaces and the third roller means is in contact with the other guide surface.

8. The apparatus as defined in claim 1 wherein
means for facilitating the wrapping of the article is disposed at at least one of the work stations, and said path being straight and located in a single plane.

9. The apparatus as defined in claim 8 wherein
the conveying means includes pocket means disposed with an axis normal to the closed loop means at a plurality of equally spaced locations along the entire path,
the closed loop means is disposed to receive an article at an article input work station and to release an article at an article output work station,
said pocket means moving through at least one package wrapping work station between the input and output work stations,
said normal axis of the pocket means at the input work station being perpendicular to the normal axis of the pocket means at the package wrapping work station.

10. The apparatus as defined in claim 8 wherein
the conveying means includes means for adjusting the vertical position of the transporting apparatus.

11. The apparatus as defined in claim 10 wherein
the adjusting means includes hydraulic lift means located at substantially the center of mass for raising and lowering the trasporting apparatus.

12. The apparatus as defined in claim 8 wherein
the conveying means includes means for adjusting the vertical position of the transporting apparatus,
the conveying means includes pocket means disposed with an axis normal to the closed loop means at a plurality of equally spaced locations along the entire path,
the closed loop means is disposed to receive an article at an article input work station and to release an article at an article output work station,
said pocket means moving through at least one package wrapping work station between the input and output work stations,
said normal axis of the pocket means at the input work station being perpendicular to the normal axis of the pocket means at the package wrapping work station,
said adjusting means being effective to align the normal axis of the pocket means at the input work station with the center line axis of the article being received therein for subsequent transporting to the package wrapping work station.

13. The apparatus as defined in claim 1 wherein
said sprocket means are fixedly mounted on a driven shaft at the driving positions, and
said driving means includes transmission means for intermittently and simultaneously rotating each driven shaft.

14. The apparatus as defined in claim 13 wherein
the transmission means includes driven gear means disposed at an end of each driven shaft and transmission rod means having driving gear means engaging the driven gear means.

15. The apparatus as defined in claim 13 wherein
the transmission means includes driven bevel gear means disposed at a common end of the driven shafts and transmission rod means having driving bevel gear means disposed at each end thereof and engaged with the driven bevel gear means.

16. An apparatus for transporting an article comprising:
(a) conveying means for moving an article along a path having a plurality of work stations,
(b) said conveying means including a plurality of pocket means, at least one endless closed loop chain and rail guide means,
(c) said closed loop chain having a plurality of links,
(d) said rail guide means extending the length of the closed loop chain and having an upper guide surface and lower guide surface,
(e) each pocket means including a carrier block having two outwardly projecting portions laterally spaced to receive therebetween a length of the chain pivotally connected at each end of the block,
(f) each pivotally connected link being attached to shaft means extending between the projecting portions,
(g) roller bearing means being connected to the outside of said projecting portions with roller means located at each end of each said shaft means extending therebetween,
(h) said roller bearing means including a third roller means on the outside of each projecting portion and located between the other two roller means,
(i) whereby during operation of the conveyor said two roller means are in contact with one of the guide surfaces and the third roller means is in contact with the other guide surface, (j) said rail guide means including an inlet guide mechanism having a curved channel to direct movement of the roller bearing means into contact with the respective upper and lower guide surfaces, and (k) means for synchronously and intermittently driving said conveying means at at least two driving positions along said path, (l) whereby the article is intermittently moved from one work station to another with the conveying means being substantially completely driven.

17. An apparatus for wrapping an article comprising:

(a) means providing an article having a sheet of wrapping material draped therearound so that the ends of the sheet project outwardly from one side and along opposing edges of the article, (b) conveying means for moving said article along a path having a plurality of work stations, (c) said conveying means including closed loop means, and (d) means for synchronously and intermittently driving said closed loop means at at least two driving positions along said path, (e) said driving means including rotatably mounted sprocket means disposed at the driving positions and means to engage the sprocket means with the closed loop means, (f) said closed loop means being free of any driving function, (g) whereby the article is intermittently moved from one work station to another with the closed loop means being substantially completely driven, (h) the conveying means includes a plurality of pocket means and at least one endless closed loop chain having a plurality of links, (i) each pocket means includes a carrier block having two outwardly projecting portions laterally spaced to receive therebetween a link of the chain pivotally connected at each end of the block, (j) each pivotally connected link being attached to shaft means extending between the projecting portions, (k) roller bearing means being connected to the outside of said projecting portions with a roller means located at each end of each said shaft means extending therebetween, (l) the conveying means includes a rail guide means extending the length of the closed loop chain and having an upper guide surface and lower guide surface, (m) the roller bearing means including a third roller means on the outside of each projecting portion and located between the other two roller means, (n) whereby during operation of the conveyor said two roller means are in contact with one of the guide surfaces and the third roller means is in contact with the other guide surface, (o) the rail guide means includes an inlet guide mechanism having a curved channel to direct movement of the roller bearing means into contact with the respective upper and lower guide surfaces.

* * * * *